(12) United States Patent
Bayer et al.

(10) Patent No.: US 8,656,809 B2
(45) Date of Patent: Feb. 25, 2014

(54) GEARING

(75) Inventors: Thomas Bayer, Igersheim (DE); Michael Schmidt, Giebelstadt (DE)

(73) Assignee: Wittenstein AG, Igersheim (DE)

( * ) Notice: Subject to any disclaimer, the term of this patent is extended or adjusted under 35 U.S.C. 154(b) by 745 days.

(21) Appl. No.: 12/439,049

(22) PCT Filed: Jul. 27, 2007

(86) PCT No.: PCT/EP2007/006670
§ 371 (c)(1),
(2), (4) Date: Feb. 26, 2009

(87) PCT Pub. No.: WO2008/028540
PCT Pub. Date: Mar. 13, 2008

(65) Prior Publication Data
US 2009/0205451 A1    Aug. 20, 2009

(30) Foreign Application Priority Data

Sep. 8, 2006 (DE) .......................... 10 2006 042 786

(51) Int. Cl.
| | |
|---|---|
| F16H 35/02 | (2006.01) |
| F16H 33/00 | (2006.01) |
| F16H 35/00 | (2006.01) |
| F16H 37/00 | (2006.01) |
| F16H 48/12 | (2012.01) |
| F16H 23/00 | (2006.01) |
| F16H 1/32 | (2006.01) |
| F16H 3/70 | (2006.01) |

(52) U.S. Cl.
USPC ................. 74/640; 74/650; 74/393; 475/164; 475/167; 475/169; 475/170; 475/180

(58) Field of Classification Search
USPC ............ 74/640, 393, 650; 475/164, 167, 169, 475/170, 180
See application file for complete search history.

(56) References Cited

U.S. PATENT DOCUMENTS

| | | | |
|---|---|---|---|
| 2,919,589 A * | 1/1960 | Sundt ............................... | 74/78 |
| 2,966,808 A | 1/1961 | Grudin | |
| 3,068,719 A * | 12/1962 | Singelmann .................... | 74/640 |
| 3,258,994 A * | 7/1966 | Gorfin .......................... | 475/163 |
| 3,468,175 A | 9/1969 | Rabek | |
| 4,449,425 A | 5/1984 | Carden | |
| 4,736,654 A * | 4/1988 | Ren .............................. | 475/168 |

(Continued)

FOREIGN PATENT DOCUMENTS

| | | |
|---|---|---|
| DE | 341053 | 9/1921 |
| DE | 1182011 B | 11/1964 |

(Continued)

OTHER PUBLICATIONS

Machine translation of DE3930064 Sep. 18, 2011.*

(Continued)

*Primary Examiner* — Tisha Lewis
(74) *Attorney, Agent, or Firm* — Bachman & LaPointe, P.C.

(57) ABSTRACT

In a gearing, in particular coaxial gearing, hollow shaft gearing, hypoid gearing, axial gearing or linear gearing, with a driving element (7), an element (3) and an output element (11), a stepping-up and transmission of a driving torque between driving element (7) and output element (11) are to take place via a plurality of movable tooth segments (5).

4 Claims, 8 Drawing Sheets

(56) References Cited

U.S. PATENT DOCUMENTS 4,798,104 A * 1/1989 Chen et al. .................... 74/63
5,351,568 A    10/1994 Feterl
5,496,225 A     3/1996 Droulon

FOREIGN PATENT DOCUMENTS

| | | |
|---|---|---|
| DE | 3930064 | 3/1991 |
| EP | 0201730 | 11/1986 |
| GB | 400282 A * | 10/1933 |
| JP | 61-112854 A | 5/1986 |
| JP | 62-093446 U | 6/1987 |
| JP | 2000050375 A | 2/2000 |
| JP | 2005-330990 A | 12/2005 |
| WO | 9936711 | 7/1999 |

OTHER PUBLICATIONS

Translation of German Office Action for DE 102006042786.6, dated Jan. 12, 2007.
Translation of German Office Action for DE 102006042786.6, dated Apr. 10, 2007.
Japanese Office Action for JP 2009-527025, dated Jul. 31, 2012.
German Office Action for DE 102006042786.6, dated Jan. 12, 2007.
German Office Action for DE 102006042786.6, dated Apr. 10, 2007.

* cited by examiner

GEARING

BACKGROUND OF THE INVENTION

The present invention relates to a gearing, in particular coaxial gearing, hollow-shaft gearing, hypoid gearing, axial gearing or linear gearing, having a drive input element, an element and a drive output element.

Conventional gearings of diverse forms and designs are known and available commercially.

Use is made commercially substantially of three different gearing technologies. Firstly, commercially, planetary gear sets are known in which, for example within a ring gear, one or more planet gears are provided coaxially by means of a usually centrally arranged sun gear for transmitting a torque to a planet gear carrier or drive output element.

In such epicyclic or planetary gear sets, high transmission speeds are not possible, and it is not possible for high torques to be transmitted with small hollow shaft diameters. Furthermore, gearings of said type are afflicted with low strength and a low level of robustness, with said gearings having a low overload capability.

It is also disadvantageous that, in particular in the case of high drive-input-side rotational speeds, a transmission ratio is restricted.

Eccentric gearings are also known, in which, usually, a planet gear is provided within a toothed ring gear in order to transmit torques and to produce transmission ratios.

A disadvantage of eccentric gearings is that said gearings require high release forces and very large bearings, in particular in the case of hollow-shaft designs, and are suitable only for hollow-shaft designs with relatively small diameters. Here, too, said eccentric gearings have low overload capabilities and low levels of robustness.

Furthermore, the transmission ratio ranges are restricted to approximately i=30 to i=100, with this being the case only at low drive input rotational speeds. At higher drive input rotational speeds, eccentric gearings of said type have a high level of wear and therefore have a short service life, which is undesirable.

Furthermore, such eccentric gearings have high friction losses and therefore low levels of efficiency, since clutches or the like are connected to eccentric gearings in order to convert the eccentric drive movement into a central movement. The efficiency of the eccentric gearing is therefore very low.

At high rotational speeds in particular, considerable vibration problems occur, which are likewise undesirable.

Also known are harmonic drive gearings which may duly also be designed as hollow-shaft gearings, with a so-called flex spline being arranged between a usually oval drive input element and an internally toothed ring gear, which flex spline is of soft and flexible design and transmits the corresponding torque between the drive input and the ring gear and permits a transmission ratio.

The so-called flex spline is subjected to permanent loads and often fails under high torques. Furthermore, the flex spline is not capable of withstanding overloads and often breaks at excessively high torques. The harmonic drive gearing also has a poor efficiency and low torsional stiffness.

SUMMARY OF THE INVENTION

The present invention is therefore based on the object of creating a gearing of the type stated in the introduction, which eliminates the stated disadvantages of the hitherto known gearings, planetary gearings, eccentric gearings and harmonic drive gearings, wherein it should be possible to freely select a very high drive-input-side rotational speed range up to approximately 6000 rpm.

Furthermore, in the above-stated rotational speed ranges, it should be possible for small to very high torques to be transmitted with the highest possible power density.

Furthermore, in the above-stated rotational speed ranges and at high torques, it should be possible to freely select transmission ratios of approximately i=10 to i=200.

Furthermore, the gearing should have a very high level of compactness and complexity while having the smallest possible installation space and lowest possible weight, corresponding to its power-to-size ratio.

In the embodiment as a hollow-shaft gearing, different diameters and also very large diameters of the drive input element and drive output element should be selected for the above-stated transmission ratios and rotational speeds, also ensuring and transmitting high torques.

Furthermore, a gearing of said type should be operable with low wear and in a fatigue-endurable manner with high overload capabilities and a long service life. High torsional stiffness and tilting resistances should be ensured for large diameters and a high degree of compactness.

This object is achieved in that a transformation and a transmission of a drive torque between the drive input element and the drive output element takes place via a multiplicity of movable tooth segments.

In the present invention, it has proven to be particularly advantageous to create a transmission in which a multiplicity of tooth segments are provided between a drive input and a stationary part or a drive output, which tooth segments, the transmission of the torque and the setting of the transmission ratio, move linearly into corresponding toothings of the drive output element or of the stationary part during the linear or rotational movement of the drive input element, in order, with a corresponding offset of the actual tooth flanks of the tooth segment, to transmit a torque with a correspondingly selected transmission ratio.

The corresponding transmission ratio can be selectively set by means of the selection of a different number of tooth segments in relation to the toothings of the stationary element or of the drive output element, in particular also by means of the selection of an outer contour of the drive input element. It is possible to select or set the transmission ratio in particular by means of the selection of the different tooth engagements or by means of the different number of engagements of the teeth of the tooth segments.

Here, it is for example possible for the drive input element to be formed on the outside as a simple cam disk, such as for example a cam contour, with always only a first group of tooth segments being in engagement with a stationary part or with the drive output element, wherein the outer contour of the drive output element may also be designed as an oval disk, wherein then in each case two groups of tooth segments are connected to the toothing of the stationary element or of the drive output element, wherein for example also in the case of a polygonal outer contour of the drive output element, three groups of tooth segments are in engagement with the corresponding toothings of the stationary element or of the drive output element.

As a profiling or contour of the drive input element, embodied as a hollow shaft, as a shaft, as a linear guide etc., it is possible to provide profilings with for example a cam, a polygon or a plurality of polygons up to for example five polygons, elevations or the like as a contour.

Furthermore, it should also be considered that a multiplicity of tooth segments with one or more teeth can slide by means of a connecting element, for example by means of a chain, on the polygon. In this way, it is possible to realize very large torques, in the case of variable transmission ratios, from approximately i=10 to i=200.

Furthermore, it is possible to select rotational speed ranges of up to a maximum of approximately 6000 rpm at the drive input side.

Here, the individual groups of tooth segments are moved linearly in a linear or rolling fashion or in the form of any desired lifting movements into corresponding toothings of the stationary element or of the drive output element by means of the outer contour of the drive input element, and a torque or a linear movement is carried out in this way by means of the corresponding offset.

Here, a linear, rolling or lifting movement of the tooth segment is coupled to the outer contour of the profiled drive output element. This may take place in various ways. For example, it is possible for individual tooth segments with one or with a multiplicity of individual toothings to be connected to one another in the manner of a chain or to be guided linearly by means of corresponding retaining elements, wherein the retaining elements may be designed to be stationary or as a drive output.

Here, it may also be considered that the individual teeth or tooth segments perform a linear lifting movement by means of the drive input element, by virtue of said teeth or tooth segments being guided linearly in corresponding drive output or stationary elements.

It is possible for different gearings to be realized by means of the present invention. The gearing is preferably designed as a coaxial gearing, with a retaining element as a drive output element for holding the tooth flanks being formed coaxially within an internally-toothed ring gear, and with the drive input element which is provided with a corresponding different and selectable contour being provided coaxially within the retaining element or the drive output element.

It should however also fall within the scope of the present invention that the drive input element is designed as an external ring gear, with an inwardly directed contour being provided as a cam-like, oval or polygonal contour or profiling, and with the individual tooth segments then being provided coaxially within said ring gear so as to be directed inward and so as to be movable linearly radially inward in the stationary element or in the drive output part which is embodied as a retaining element, with a stationary part, or a drive output shaft which can be driven in rotation, being provided within as a drive output element with an outer toothing into which the tooth segments can engage in order to transmit a torque with a selectable transmission ratio.

In a further exemplary embodiment of the present invention, the gearing may be embodied as an axial gearing or an angular gear, with the individual tooth segments being guided linearly axially in an element which is stationary or embodied as a drive output element, and wherein by means of a corresponding rotationally driven drive input element profiled axially in the manner of a circular ring, the respective tooth flanks of the tooth segments can be moved relative to an axial circular-ring-like toothing of a stationary retaining element or of a drive output element to be driven.

In the case of a purely axial gearing, the tooth segments engage directly linearly axially into the adjacent drive output or retaining part with toothings.

In the case of an angular embodiment as an angular gear or hypoid gearing, the tooth segments are correspondingly directed at an angle with respect to the toothing of the drive output element or of the stationary element.

It should also fall within the scope of the present invention that the gearing is embodied as a linear gearing. In this case, the linear drive input, which is designed in the manner of a rod, has a corresponding outer contour or profiling which pushes the individual adjacent tooth segments, arranged in a preferably stationary retaining element and linearly guided, into corresponding toothings of a toothed rack in order to move the drive output element, which is embodied as a toothed rack, back and forth linearly with a desired transmission ratio.

Here, in the case of a linear gearing, it can also be conceivable for the drive input element as a linear element to be provided with corresponding profilings which move corresponding tooth segments, linearly guided in a drive output element with respect to a linear stationary element with a toothing, in order to produce a linear movement in the desired transmission ratio between the drive output element and drive input element. In this case, the tooth segments are coupled, in terms of their linear movement, to the outer or the outer contour of the profiling.

BRIEF DESCRIPTION OF THE DRAWINGS

Further advantages, features and details of the invention can be gathered from the following description of preferred exemplary embodiments and on the basis of the drawing, in which.

DETAILED DESCRIPTION

Figure 1:
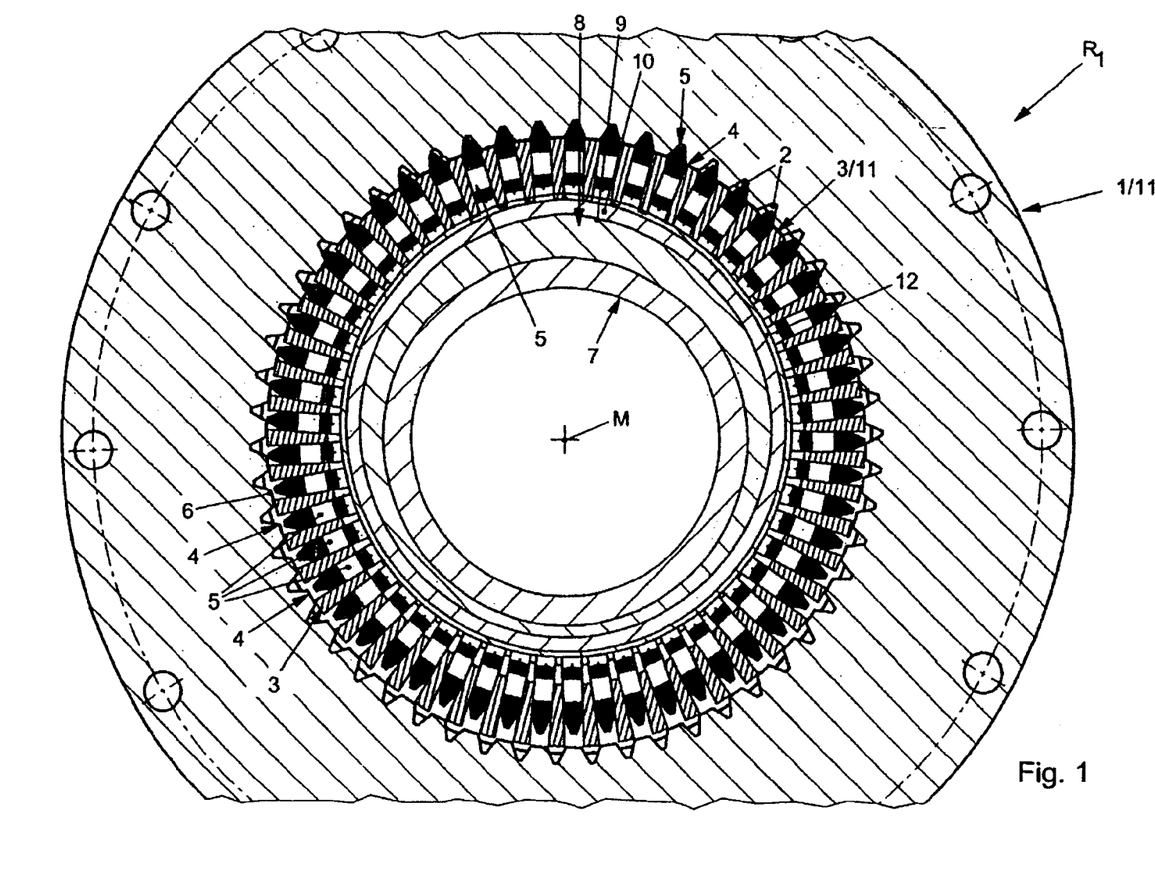
FIG. 1 shows a schematically illustrated cross section through a gearing, in particular a coaxial gearing.

According to FIG. 1, a gearing $R_1$, embodied as a coaxial gearing, has a ring gear 1 which has an inner toothing 2.

An element 3 is inserted in the manner of a circular ring within the ring gear 1, with a multiplicity of tooth segments 5 which are arranged radially adjacent to one another and in corresponding guides 4 being inserted in the circular-ring-like element 3. The tooth segments 5 are mounted so as to be movable radially back and forth within the guide 4, and are provided at one end with a tooth flank 6.

A drive input element 7, embodied as a shaft or hollow shaft, is provided within the element 3 with the tooth segments 5 held therein, which drive input element 7 has an outer profiling 8, which is formed for example with a contour, an elevation, in the manner of a polygon or cam.

If appropriate, a bearing arrangement 10 is provided between an outer contour 9 of the profiling 8 of the drive input element 7 and the element 3, or at one end of the tooth segments 5.

The mode of operation of the present invention is as follows:

If the drive input element 7 is for example driven in rotation about a central axis M, then the individual tooth segments 5 are moved radially outward into the toothing 2 of the ring gear 1, correspondingly on account of the profiling 8 over the outer contour 9. As a result of the different number of toothings 2 of the ring gear 1 in relation to the different number of tooth segments 5, which are partially in engagement, it is possible to selectively set a transmission ratio; here, it is possible for the drive torque which is introduced via the drive input element 7 to run selectively via the element 3 as a drive output element or the ring gear 1 as a drive output element 11.

A requirement for this is that either the element 3 is designed as a stationary element 3 and the ring gear 1, as a drive output element 11, is radially rotatable, or the ring gear 1 is stationary and the element 3 for holding the tooth segments 5 is designed as a drive output element 11. Both of these variants are conceivable here.

It is possible here as a bearing arrangement 10 to provide for example a roller bearing arrangement, an antifriction bearing arrangement or the like, with a bearing arrangement 10 of said type being held, if appropriate, by means of a so-called flex spline 12. This is however not strictly necessary. The transmission of the profiling 8 to the respective tooth segments 5 to radially move the latter into the toothing 2 may also take place by means of sliding friction. It is however important that the tooth segments 5 are coupled directly or indirectly to the outer contour 9 of the profiling 8, which relates to the linear movement. With regard to the rotational movement of the drive input element 7 or the rotational movement of the outer contour 9 of the profiling 8, said rotational movement is however decoupled from the tooth segments 5.

In this way, the tooth segments 5 are meshed with the toothing 2 of the ring gear 1 linearly and radially corresponding to the outer contour 9.

Figure 2:
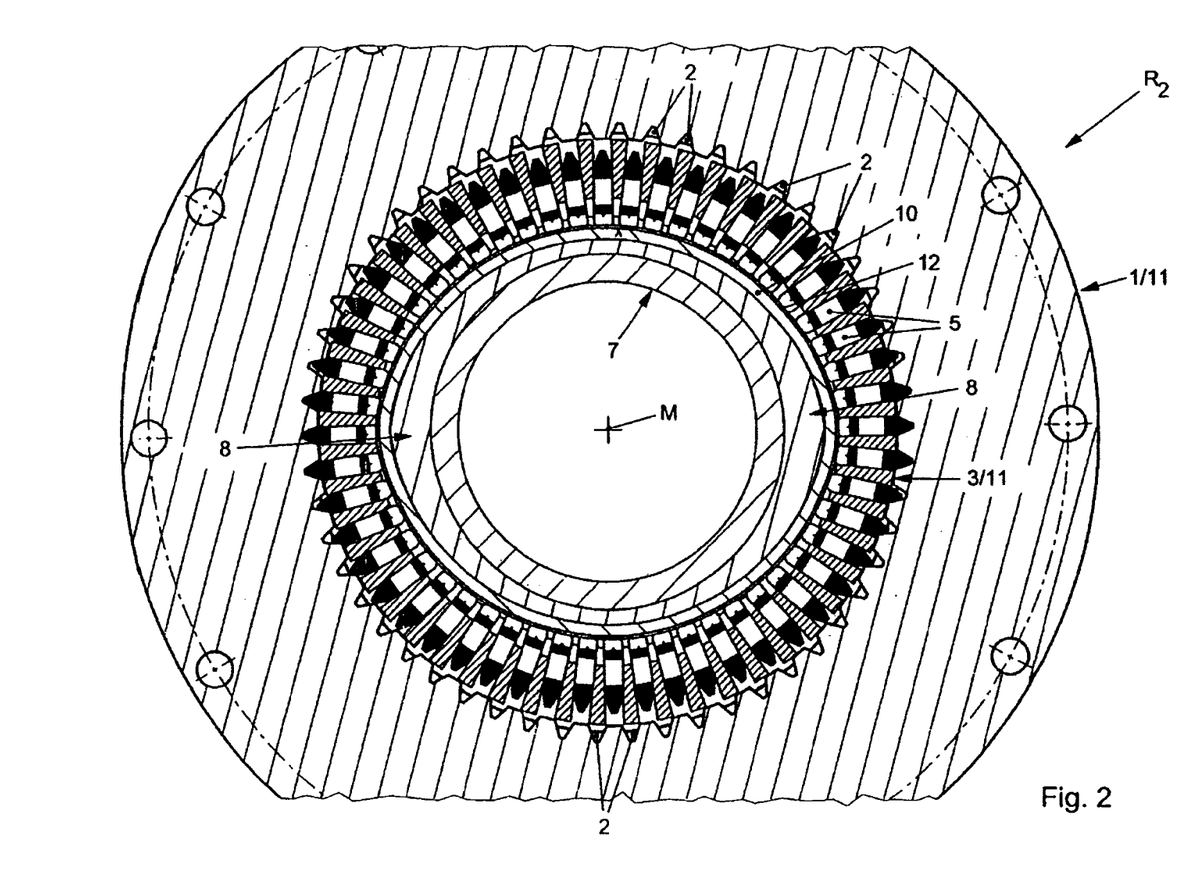
FIG. 2 shows a schematically illustrated cross section through the gearing, in particular coaxial gearing, according to FIG. 1 as a further exemplary embodiment.

FIG. 2 shows a gearing $R_2$ which corresponds approximately to the type mentioned in the introduction.

Said gearing $R_2$ differs in that the drive input element 7 has a profiling 8 which has two opposite elevations in a polygonal and oval manner, such that, by means of the number of different profilings 8 or elevations of the drive input element 7, two groups of tooth segments 5 engage simultaneously into toothings 2, such that it is also possible for relatively high torques to be transmitted at different transmission ratios in the above-described way.

Figure 3:
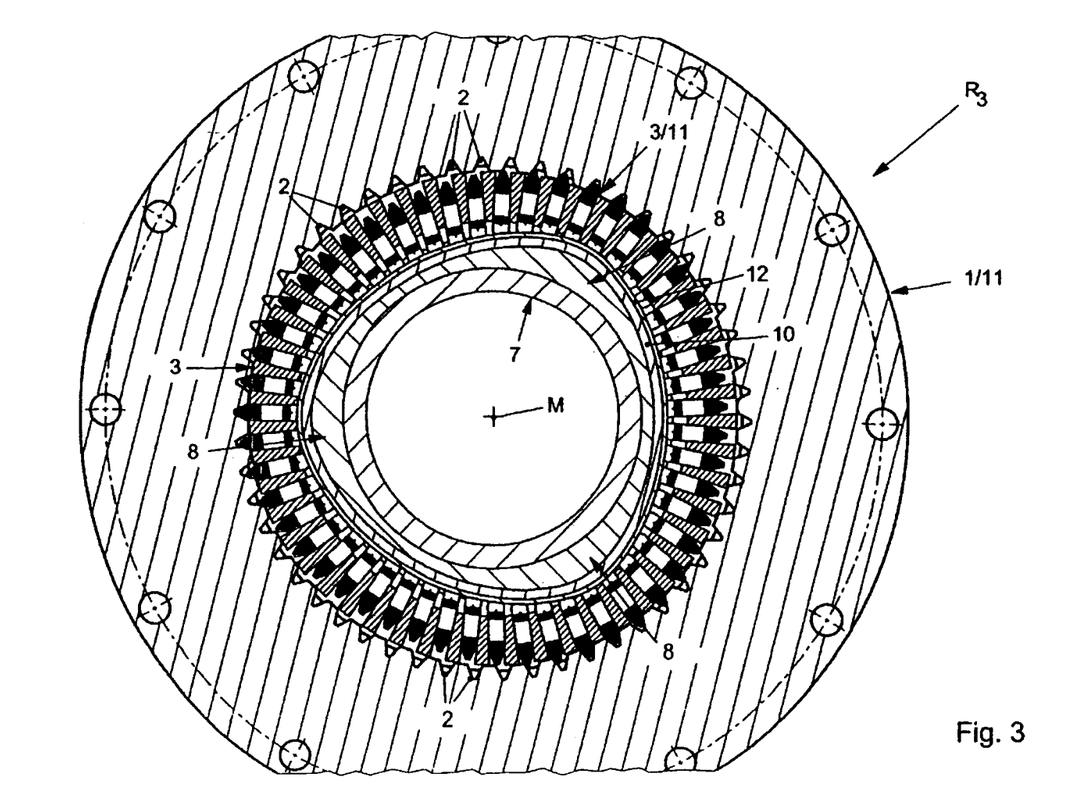
FIG. 3 shows a schematically illustrated cross section through a further exemplary embodiment of a coaxial gearing according to FIGS. 1 and 2.

The exemplary embodiment of the present invention according to FIG. 3 shows a gearing $R_3$ which corresponds approximately to the mode of operation of the gearings $R_1$ and $R_2$.

Said gearing $R_3$ differs in that the drive input element 7 has, as outer profilings 8, three polygonal profilings and therefore forms three groups of tooth segments 5 which are simultaneously in engagement with toothings 2 of the ring gear 1.

In this way, too, it is possible by means of the varying number of profilings 8 of the drive input element 7 to set or vary a transmission ratio and a higher transmission of torque.

It is likewise possible by means of the different number of tooth segments 5 and the different number of toothings 2 of the ring gear 1 to influence a transmission ratio. It is also important, as can be clearly seen from the exemplary embodiments of the gearings $R_2$, $R_3$ from FIGS. 2 and 3, for an inner contour of the toothing 2 to be approximately matched to an outer contour 9 of the drive input element 7 or of the profiling 8. The same also applies to the element 3.

Figure 4:
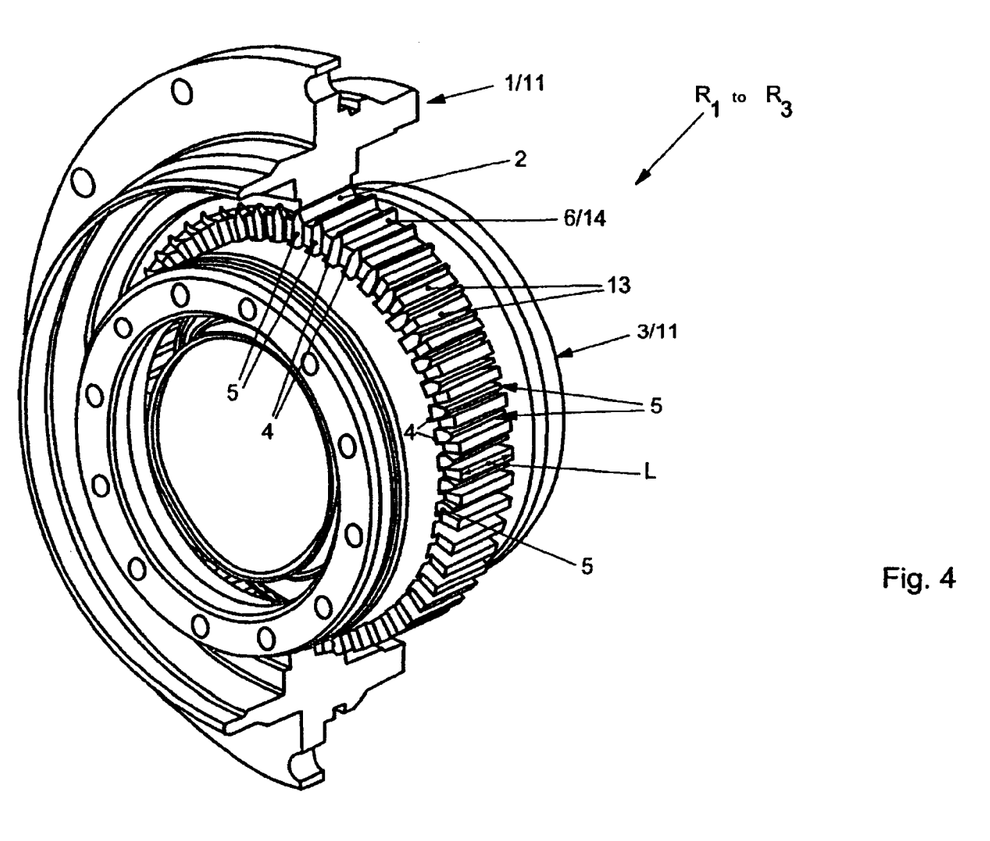
FIG. 4 shows a partially cut-away perspective view of the coaxial gearing according to FIG. 1.

The exemplary embodiment of the present invention according to FIG. 4 shows a gearing $R_1$ to $R_3$ in a perspective view.

In said figure, the element 3 is arranged coaxially within the ring gear 1 with the inner toothing 2, with the tooth segments 5 being arranged, so as to be movable radially and linearly outward, in corresponding slot-like guides 4.

To assist the guide 4, the element 3 may additionally be assigned support webs 13 between in each case individual adjacent tooth segments 5.

As can be clearly seen from the figures, during the engagement into the toothing 2 of the ring gear 1, the individual teeth 14 or tooth flanks 6 project out of the guides 4, in particular out of the support webs 13 of the element 3, and are in engagement with the toothing 2 of the ring gear 1. The rest of the teeth are retracted, since tooth segments 5 are pushed radially into the toothing 2 only in the region of the profiling 8.

As a result of the respective slight radial offset of the tooth segments 5 with respect to the toothing, it is possible for a drive torque of the drive input element 7 to be transmitted to the drive output element 11 with the desired transmission ratio.

Also, a different length L and also size of the respective tooth segments 5 and also the different number of engagements of the tooth segments 5 into the toothing 2 of the ring gear 1 or of the drive output element 11 serve not only to determine the transmission ratio but rather also to dimension any desired overall sizes, different torques and speeds.

Figure 5:
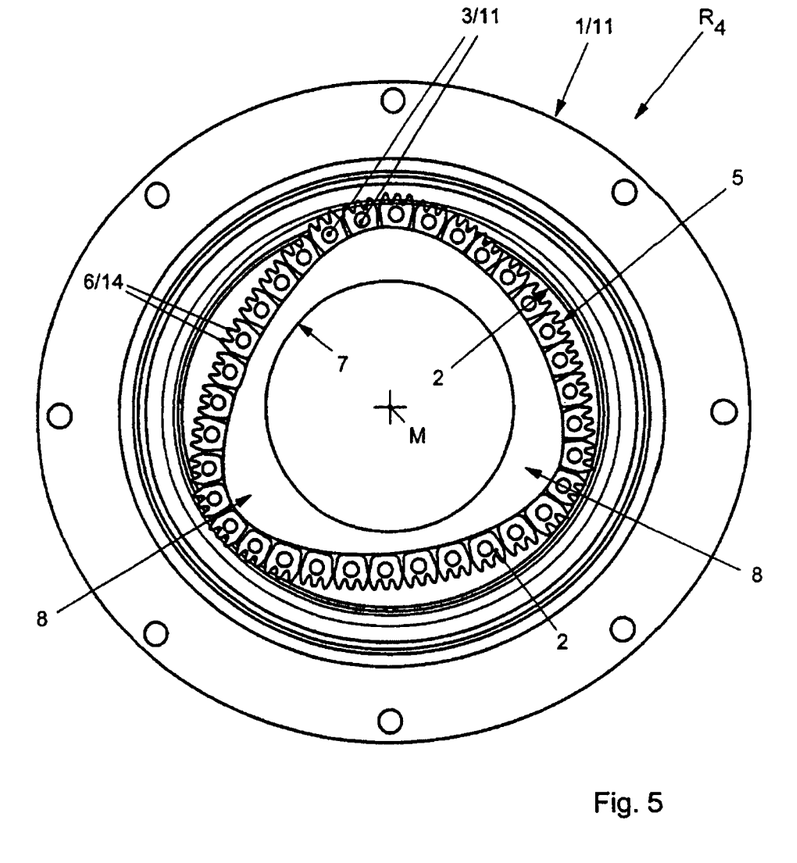
FIG. 5 shows a schematically illustrated plan view of a further exemplary embodiment of a gearing according to FIG. 1.

According to FIG. 5, a gearing $R_4$, in particular coaxial gearing, has a ring gear 1 with an inner toothing 2 in which, on a preferably polygonal profiling 3 of the drive input element 7, a multiplicity of tooth segments 5 surround the profilings 8 in the manner of a chain or in a linked fashion, with it also being possible for individual tooth segments 5 to have a multiplicity of individual tooth flanks 6 or teeth 14. As is illustrated in particular in FIG. 6, the individual tooth segments 5 can slide, by means of, for example, a chain 15, on the outer contour 9 of the profiling 8 in a manner rotationally decoupled from said outer contour, and said individual tooth segments 5 can nevertheless, by means of the corresponding profiling, engage into, so as to roll in, the toothing 2 of the ring gear 1 in order to transmit torques and to produce a transmission ratio.

Figure 6:
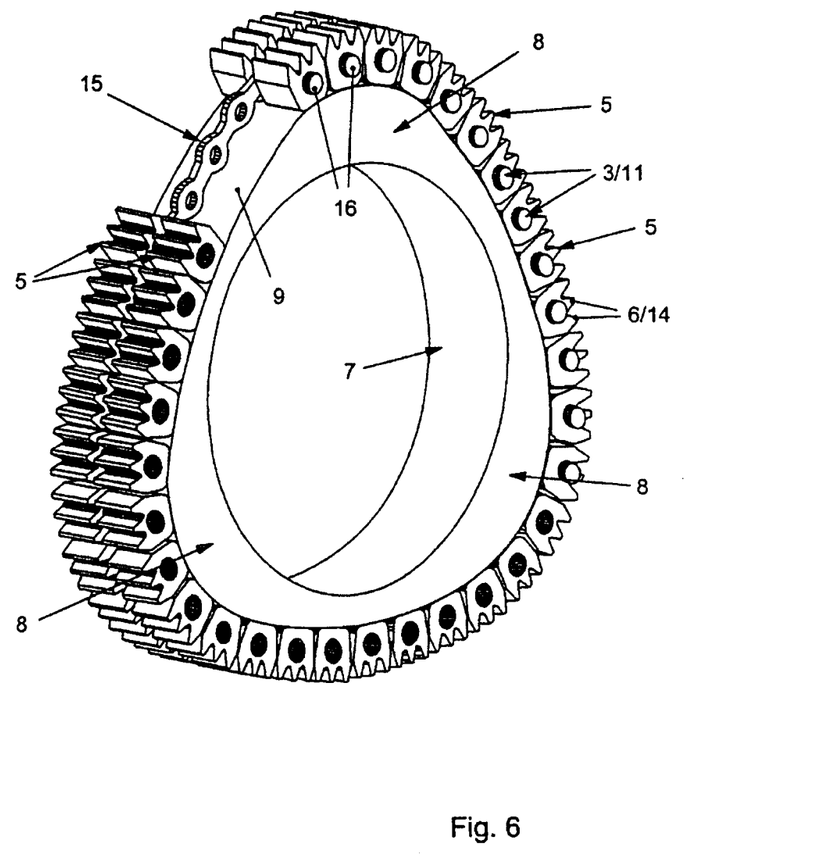
FIG. 6 shows a perspective view of a part of the gearing according to FIG. 5.

Here, the respective tooth segments 5 are connected by means of bolts 16 to the chain 15, with the torque being transmitted via the bolts 16 as element 3 or possibly as drive output element 11, or with the tooth segments 5 being prevented from rotating in this way.

By means of couplings (not illustrated in any more detail here), it is possible, in the case of the design of the elements 3 or the bolts 6 as drive output element 11, for an eccentric movement to be transformed into a rotational movement. This is likewise to be encompassed within the scope of the present invention.

Figure 7:
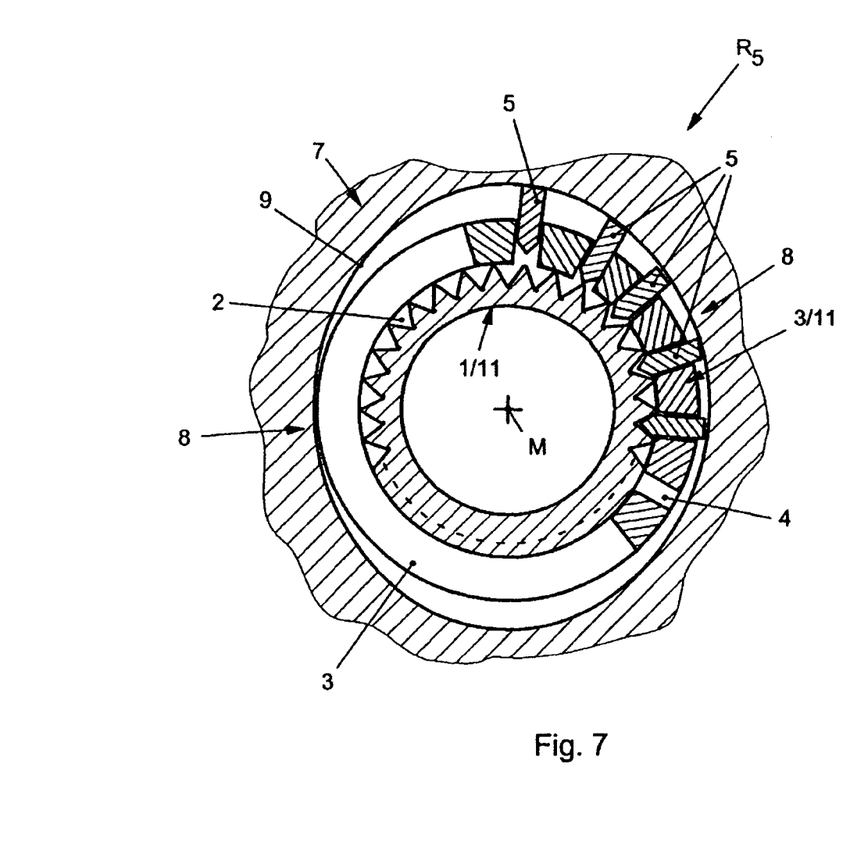
FIG. 7 shows a schematically illustrated cross section through a further exemplary embodiment of a further gearing, in particular coaxial gearing.

The exemplary embodiment of the present invention according to FIG. 7 shows a gearing $R_5$, in particular a coaxial gearing, which corresponds approximately to the type described above. Said gearing $R_5$ differs in that, in said gearing $R_5$, the drive input element 7 is arranged so as to be situated at the outside and is provided with at least one or more profilings 8, with the drive input element 7 being designed as a hollow shaft.

The element 3 with guides 4 for radially holding the tooth segments 5 is provided coaxially within the drive input element 7, with only some tooth segments 5 being indicated in the present exemplary embodiment.

As a result of the outer drive input element 7 or the profiling 8 being correspondingly driven in rotation, the tooth segments 5 are moved radially from the outside to the inside in the above-described manner into corresponding outer toothings 2 of the inner ring gear 1 or drive output element 11.

Here, the tooth segments 5 are radially coupled to, and rotationally decoupled from, an inner contour 9 of the profiling 8 of the drive input element 7.

Figure 8:
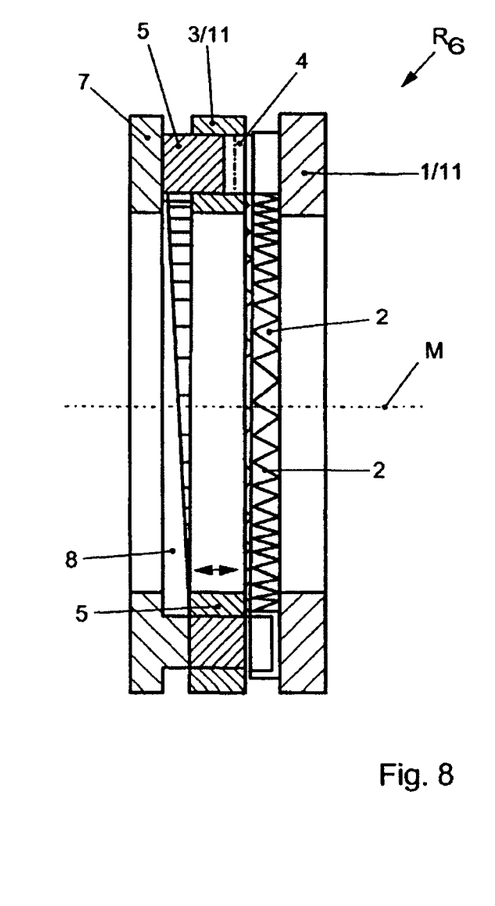
FIG. 8 shows a schematically illustrated longitudinal section through a gearing, in particular an axial gearing.

The exemplary embodiment of the present invention according to FIG. 8 shows a gearing $R_6$ which is designed correspondingly to the type described above. Said gearing $R_6$ differs in that it is designed as an axial gearing. Said gearing $R_6$ may however also be designed as a hypoid gearing.

Here, a cam disk is used as a drive input element 7, which cam disk may have at least one profiling 8, elevation, cam track or the like in order to move a multiplicity of tooth segments 5 individually, in groups or in a plurality of groups into corresponding axial toothings 2 of a ring gear 1 or drive output element 11 in order to transmit a torque with a desired transmission ratio in the above-described manner.

Here, as indicated in the direction of the double arrow, the tooth segments 5 are moved axially. If the axial gearing is designed as a hypoid gearing, then the tooth segments 5 or the end-side toothings 2 of the ring gear 1 are correspondingly angled. The invention is not restricted to this.

Figure 9:
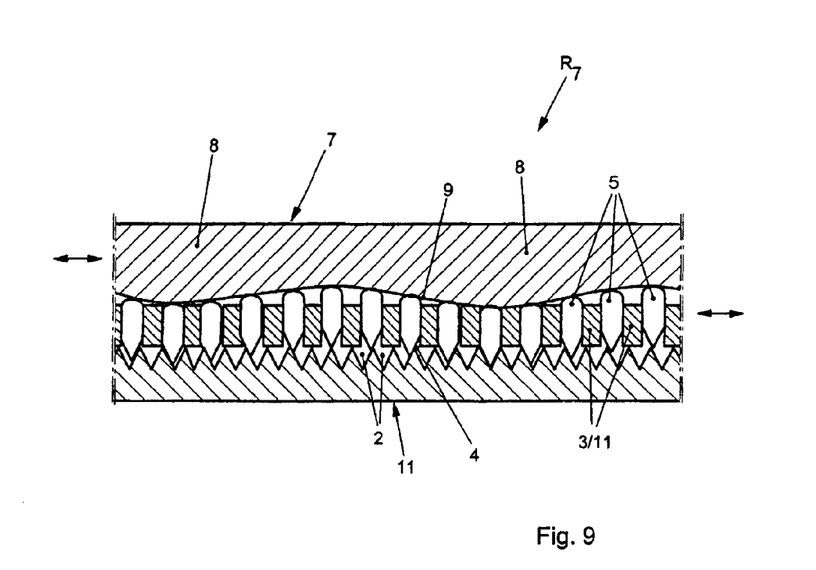
FIG. 9 shows a schematically illustrated longitudinal section through a gearing, in particular through a linear gearing.

The final exemplary embodiment of the present invention according to FIG. 9 shows a gearing $R_7$ which is designed as a linear gearing.

Here, a linear rod as a drive input element 7 is moved linearly, which linear rod is provided with corresponding profilings 8, as elevations, tracks or the like.

By means of the contour 9 of the profilings 8 of the drive input element 7, it is possible, in the above-described manner, for the tooth segments 5, which are guided in a linearly movable manner and retained in a linear element 3, to move linearly back and forth in the guides 4 thereof.

Here, the tooth segments 5 are retained in the above-described manner in guides 4 and engage into corresponding toothings 2 of a drive output element 11, designed as a toothed rack. In this case, the element 3 for holding the tooth segments is fixed.

If the element 3 is used as a drive output element 11, then the drive output element 11 is fixed to the toothings 2.

In this way, it is possible for a linear movement to be transmitted in the above-described manner with a desired transmission ratio and with the desired torque.

It should also be considered that a movement of the tooth segments 5 within the guide 4 is coupled to the outer contour 9 of the profilings 8, with said tooth segments 5 being decoupled from a linear movement of the drive input element 7 itself.

The invention claimed is:

1. A gearing, in particular coaxial gearing, hollow-shaft gearing, hypoid gearing or axial gearing, having a drive input element, a drive output element, and an element between the drive input element and the drive output element, and a multiplicity of movable tooth segments provide a transformation and a transmission of a drive torque between the drive input element and the drive output element, wherein the multiplicity of tooth segments are moved by means of the drive input element, wherein the drive input element is embodied as an element which is driven in rotation, and has a profiling in order to move individually radially arranged and movable tooth segments with respect to the element or the drive output element, wherein the multiplicity of tooth segments can be moved in a linear, rolling or lifting fashion directly or indirectly by means of an outer profiling of the drive input element, wherein the profiling forms at least two elevations, wherein at least two groups of tooth segments engage simultaneously into the toothing, wherein at least one bearing arrangement as roller bearing arrangement is provided between the profiling of the input drive element and the tooth segments, with the tooth segments being coupled to a position of an outer contour of the drive input element.

2. A gearing, in particular coaxial gearing, hollow-shaft gearing, hypoid gearing, axial gearing or linear gearing, having a drive input element, a drive output element, and an element between the drive input element and the drive output element, and a multiplicity of movable tooth segments provide a transformation and a transmission of a drive torque between the drive input element and the drive output element, wherein the multiplicity of tooth segments are moved by means of the drive input element, the drive input element has at least one profiling which acts on the tooth segments and moves the tooth segments into corresponding toothings in the element in order to transmit torques and to set a selectable transmission ratio, the tooth segments are moved by means of the drive input element toward toothings in the element, with the multiplicity of tooth segments being mounted in a movable fashion in the drive output element or in the element, the tooth segments are moved by means of the drive input element with respect to the element or with respect to the drive output element, and wherein the drive input element is embodied as an element which is driven in rotation, and has an axial profiling in order to move individually radially arranged and axially movable tooth segments with respect to the element or the drive output element, wherein the multiplicity of tooth segments can be moved in a linear, rolling or lifting fashion directly or indirectly by means of an outer profiling of the drive input element, with the tooth segments being coupled to a position of an outer contour of the drive input element.

3. A gearing, in particular coaxial gearing, hollow-shaft gearing, hypoid gearing, axial gearing or linear gearing, having a drive input element, a drive output element, and an element between the drive input element and the drive output element, and a multiplicity of movable tooth segments provide a transformation and a transmission of a drive torque between the drive input element and the drive output element, wherein the multiplicity of tooth segments are moved by means of the drive input element, the drive input element has at least one profiling which acts on the tooth segments and moves the tooth segments into corresponding toothings in the element in order to transmit torques and to set a selectable transmission ratio, the tooth segments are moved by means of the drive input element toward toothings in the element, with the multiplicity of tooth segments being mounted in a movable fashion in the drive output element or in the element, the tooth segments are moved by means of the drive input element with respect to the element or with respect to the drive output element, and wherein the drive input element is of annular design and has an axial profiling which axially moves a multiplicity of tooth segments which are guided in a radially arranged element, said tooth segments, by means of an axial movement thereof, engage into an axial toothing of a drive output element, in order to transmit torques and to produce desired transmission ratios, wherein the multiplicity of tooth segments can be moved in a linear, rolling or lifting fashion directly or indirectly by means of an outer profiling of the drive input element, with the tooth segments being coupled to a position of an outer contour of the drive input element.

4. The gearing as claimed in one of claims 1, 2 or 3, wherein the tooth segments are coupled to the outer contour, to an outer track of the drive input element in the linear movement direction of the tooth segments, with a linear, rolling or lifting movement of the tooth segments being decoupled from a rotational or linear movement of the drive input element.

* * * * *